United States Patent
Ishizuka et al.

(10) Patent No.: US 11,597,847 B2
(45) Date of Patent: Mar. 7, 2023

(54) PLASMA-CURABLE OFFSET PRINTING INK COMPOSITION, METHOD FOR PRODUCING PRINTED MATTER USING SAME, AND PRINTING METHOD

(71) Applicant: SAKATA INX CORPORATION, Osaka (JP)

(72) Inventors: Takashi Ishizuka, Osaka (JP); Yasutsugu Mochizuki, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 116 days.

(21) Appl. No.: 16/772,299

(22) PCT Filed: Nov. 15, 2018

(86) PCT No.: PCT/JP2018/042294
§ 371 (c)(1),
(2) Date: Jun. 12, 2020

(87) PCT Pub. No.: WO2019/123915
PCT Pub. Date: Jun. 27, 2019

(65) Prior Publication Data
US 2021/0079240 A1    Mar. 18, 2021

(30) Foreign Application Priority Data
Dec. 18, 2017 (JP) .............................. JP2017-241862

(51) Int. Cl.
| | | |
|---|---|---|
| C09D 11/101 | (2014.01) | |
| C09D 11/06  | (2006.01) | |
| C09D 11/105 | (2014.01) | |
| B41M 7/00   | (2006.01) | |
| B41M 5/00   | (2006.01) | |
| C09D 11/037 | (2014.01) | |
| C09D 11/103 | (2014.01) | |

(52) U.S. Cl.
CPC ......... *C09D 11/101* (2013.01); *B41M 5/0023* (2013.01); *B41M 7/0072* (2013.01); *C09D 11/037* (2013.01); *C09D 11/06* (2013.01); *C09D 11/103* (2013.01); *C09D 11/105* (2013.01)

(58) Field of Classification Search
CPC ..... C09D 11/101; C09D 11/037; C09D 11/06; C09D 11/103; C09D 11/105; B41M 5/0023; B41M 7/0072
See application file for complete search history.

(56) References Cited

U.S. PATENT DOCUMENTS

| | | | | |
|---|---|---|---|---|
| 4,248,997 | A  |   | 2/1981  | Ihida |
| 2007/0058019 | A1 | * | 3/2007  | Saitoh ............... B41J 11/00216 |
| | | | | 347/101 |
| 2007/0238809 | A1 | * | 10/2007 | Matsuyoshi ......... C09D 11/033 |
| | | | | 523/160 |
| 2010/0021695 | A1 | * | 1/2010  | Naoyuki .............. C25D 1/006 |
| | | | | 204/192.15 |

FOREIGN PATENT DOCUMENTS

| | | | |
|---|---|---|---|
| CN | 103055465 | A | 4/2013 |
| CN | 103101342 | A | 5/2013 |
| CN | 104629524 | A | 5/2015 |
| EP | 0677090 | B1 | 1/2003 |
| JP | 2005290079 | A | 10/2005 |
| JP | 2007054987 | A | 3/2007 |
| JP | 2007098232 | A * | 4/2007 ............... B09B 3/00 |
| JP | 2007106105 | A | 4/2007 |
| JP | 2008150469 | A | 7/2008 |
| JP | 4649952 | B2 | 3/2011 |
| JP | 2011231217 | A | 11/2011 |
| JP | 2012102217 | A | 5/2012 |
| JP | 5118823 | B2 | 1/2013 |
| JP | 2015193823 | A | 11/2015 |
| JP | 2016222785 | A | 12/2016 |
| JP | 2017031355 | A | 2/2017 |
| WO | 2013024928 | A1 | 2/2013 |

OTHER PUBLICATIONS

European Patent Office, Extended European Search Report Issued in Application No. 18891975.7, dated Oct. 7, 2021, Germany, 8 pages.

* cited by examiner

*Primary Examiner* — Yaovi M Ameh
(74) *Attorney, Agent, or Firm* — Alleman Hall Creasman & Tuttle LLP

(57) ABSTRACT

A plasma-curable ink composition for offset printing having high reactivity with plasma and capable of being hardened into a sufficiently dried state even in the use of plasma generated by a remote-type plasma generator, and a method for producing printed matter and a method for printing information using the same. The plasma-curable ink composition for offset printing comprises a pigment, a binder resin, and at least one specific ingredient selected from the group consisting of castor oil, polymerized oil, and alkyd resins having an acid value of 10 mg KOH/g or more.

11 Claims, No Drawings

PLASMA-CURABLE OFFSET PRINTING INK COMPOSITION, METHOD FOR PRODUCING PRINTED MATTER USING SAME, AND PRINTING METHOD

TECHNICAL FIELD

The present invention relates to a plasma-curable ink composition for offset printing, and a method for producing and printing printed matter with the ink composition.

BACKGROUND ART

Offset printing is a printing process that utilizes water repellency of an oil-based ink composition for offset printing (hereinafter, simply also referred to as "ink composition"). The offset printing process is characterized in that an even printing plate is used unlike a relief printing process with an uneven printing plate. The even printing plate is provided with lipophilic image portions and hydrophilic non-image portions in place of the irregularities of the uneven printing plate, and the non-image portions are moistened with a dampening solution supplied to the printing plate at the beginning of printing. When the oil-based ink composition is then supplied to the printing plate, the ink composition does not adhere to the non-image portions due to repellency of water films of the dampening solution, and adheres only to the lipophilic image portions. In this process flow, an image is formed on the surface of the printing plate with the ink composition, and the image is transferred to a blanket and then a substrate (in many cases, a paper sheet is selected as the substrate) to complete printing.

Besides the offset printing using the dampening solution as described above, a dry offset printing process has also been put into practical use with a printing plate having non-image portions composed of silicone resin. In this printing process, non-image portions are formed not by repellency of the ink composition to the dampening solution, but by repellency of the ink composition to the silicone resin. Apart from these differences, the dry offset printing is also a printing process common to the offset printing with the dampening solution. Accordingly, the term "offset printing" is used in this specification as a concept common to a wet printing process with a dampening solution and a dry printing process.

If the ink composition adhering to the surfaces of the printed sheets yielded by the offset printing is insufficiently dried, set-off occurs when the printed sheets are stacked, or the ink composition adheres to a person's fingers when the printed sheets are touched, thereby the printed sheets cannot be transferred to a subsequent step or commercially distributed as products. Accordingly, a step of drying the ink composition adhering to the surfaces of the printed sheets to fix the ink composition on the sheets is required after the printing step. Well-known drying steps of the ink composition in the offset printing process are four types, such as oxidative polymerization, vaporization, permeation, and photopolymerization, which have been selected depending on the type of the ink composition.

In a step of drying the ink composition by permeation, an oil ingredient contained in the ink composition adhering to the surfaces of printed sheets permeates the inside of the minted sheets to achieve the dried surface of the ink composition in a relatively rapid manner. Unfortunately, the ink composition spreads on the surfaces of printed sheets in this drying step to lead to expansion of halftone dots in some cases. A step of drying the ink composition by vaporization comes with a concern about an increase in environmental load due to the release of volatile organic compounds (VOCs) into the atmosphere.

From such a viewpoint, a step of drying the ink composition by oxidative polymerization has been frequently employed to achieve printed matter with high aesthetics. In the ink composition used in this drying step, an unsaturated oil having a high iodine value, such as linseed oil, is used as an oil ingredient, and oxygen in the air can form a tack-free or dried film through oxidative polymerization of the unsaturated oil. The step of drying the ink composition by the oxidative polymerization has no stage of permeation of the oil ingredient into the inside of printed matter or no stage of release of the VOCs into the atmosphere, thereby printed matter having high aesthetics can be produced with low environmental load. Unfortunately, the chemical reaction in the oxidative polymerization of the unsaturated oil requires relatively long times, and thereby some problems may occur due to poor drying of the printed matter.

In view of the above background, printing by photopolymerization involving a drying step of irradiation of the printed matter with ultraviolet rays after printing has been extensively used in recent years. The ink composition used in the drying step contains monomers or oligomers having ethylenically unsaturated bonds and a photopolymerization initiator that generates radicals by irradiation with active energy rays, such as ultraviolet rays. Upon irradiation with active energy rays after printing, the ink composition instantaneously polymerizes to form a tack-free or dried film. In recent years, various ink compositions involving such a drying step have been proposed (see, for example, PTLs 1 and 2). A method of printing with an ink composition containing specific ingredients and then curing the resulting printed matter through irradiation with plasma to fix the ink composition present on the surface of the printed matter has also been proposed (See, for example, PTL 3).

CITATION LIST

Patent Literatures

PTL1: JP 2012-102217A
PTL2: JP 4649952B
PTL3: JP 5118823B

BRIEF DESCRIPTION OF THE INVENTION

Problems to be Solved

A method of irradiating the printed matter with plasma after printing to dry or fix the ink composition is a novel procedure, and is advantageous in that the release of the unreacted monomers or decomposed products of the photopolymerization initiator can be reduced compared to a drying step by irradiation with ultraviolet rays. The drying of the ink composition in this method can be achieved by an increase in molecular weight through the reaction of ingredients in the ink composition with plasma energy. The plasma used in this drying step is categorized into a direct type and a remote type by the scheme of plasma generation. The plasma is generated by ionization of gas present in a discharge space through interelectrode discharge. In the direct-type plasma, a plasma irradiation target (i.e., printed matter in the present invention) is directly fed into the discharge space to be irradiated with plasma. In the remote-type plasma, the source gas of plasma is circulated from the outside to the inside of the discharge space to be converted into plasma gas, and the plasma irradiation target (i.e., printed matter in the present invention) is irradiated with the plasma gas outside the discharge space.

The method of irradiation with plasma in the invention disclosed in PTL 3 is based on the use of direct-type plasma, and thereby this method is advantageous in rapid drying of the ink composition because the irradiation target can be irradiated with highly reactive plasma immediately after generation. However, the use of direct-type plasma has some problems: a printing substrate, such as a paper sheet, may be damaged during passing through the discharge space; or a printing substrate may be jammed at an inlet or outlet having a narrow gap, which can isolate the discharge space from the outside, due to vertical flapping of the substrate during a feeding process. In contrast, such problems do not occur in the use of remote-type plasma. However, the reactivity of plasma decreases accompanied by the movement of plasma gas from the discharge space, and the dispersion of plasma gas, for example, may cause insufficient drying of the ink composition.

The present invention has been achieved in view of the above-mentioned technical backgrounds. An object of the present invention is to provide a plasma-curable ink composition for offset printing leading to a sufficiently dried state even in the use of plasma generated by a remote-type plasma generator and having high reactivity with plasma, and a method for producing printed matter and a method for printing with the ink composition.

Means to Solve Problems

The present inventors, who have carried out intensive studies to solve the problems as described above, have found the following fact: an ink composition for offset printing containing a pigment, a binder resin, and at least one specific ingredient selected from the group consisting of castor oil, polymerized oil, and alkyd resins having an acid value of 10 mg KOH/g or more can remarkably facilitate polymerization reaction rate by irradiation with plasma. The present invention has been completed based on such findings and specifically provides the following ink composition:

(1) The present invention discloses a plasma-curable ink composition for offset printing containing a pigment, a binder resin, and at least one specific ingredient selected from the group consisting of castor oil, polymerized oil, and alkyd resins having an acid value of 10 mg KOH/g or more.

(2) The present invention also discloses the plasma-curable ink composition for offset printing according to (1), wherein the content of the specific ingredient is 2.5 mass % or more in the entire composition.

(3) The present invention also discloses the plasma-curable ink composition for offset printing according to (1) or (2), wherein the polymerized oil is boiled oil.

(4) The present invention also discloses the plasma-curable ink composition for offset printing according to (1) to (3), wherein the polymerized oil is at least one selected from the group consisting of polymerized soybean oil, polymerized linseed oil, polymerized castor oil, polymerized and dehydrated castor oil, and polymerized tung oil.

(5) The present invention also discloses a method of producing printed matter, comprising the steps of:
printing information on a substrate with the plasma-curable ink composition for offset printing according to any one of (1) to (4), and
irradiating the printed substrate with plasma for curing to fix the ink composition present on the surface of substrate.

(6) The present invention also discloses a method of producing printed matter according to (5), wherein the plasma is generated by a remote-type plasma generator.

(7) The present invention also discloses a method of producing printed matter according to (5) or (6), wherein the plasma is generated by supplying a discharge space between two electrodes with a stream of air, oxygen, nitrogen, carbon dioxide, or any mixture thereof.

(8) The present invention also discloses a method of producing printed matter, comprising the steps of:
printing information on a substrate with the plasma-curable ink composition for offset printing according to any one of (1) to (4), and
irradiating the surface of the printed ink composition with plasma to fix the ink composition on the substrate.

Advantages of the Invention

The present invention provides a plasma-curable ink composition for offset printing that can lead to a sufficiently dry state even in the use of plasma generated by a remote-type plasma generator and have high reactivity with plasma, and a method for producing printed matter with the ink composition.

EMBODIMENTS OF THE INVENTION

A plasma-curable ink composition for offset printing, a method for producing printed matter with the ink composition, and a method for printing will now be described, respectively, in accordance with embodiments of the present invention. It should be noted that the present invention is not limited to the following aspects or embodiments, and can be implemented with appropriate modifications within the scope of the present invention.

<Plasma-Curable Ink Composition for Offset Printing>

The inventive plasma-curable ink composition for offset printing (hereinafter simply referred to as "ink composition") is applicable to offset printing and has high curability by irradiation with plasma consisting of ionized gas. More specifically, ingredients containing at least one specific ingredient selected from the group consisting of castor oil, polymerized oil, and alkyd resins having an acid value of 10 mg KOH/g or more in the ink composition are polymerized into a high molecular weight product through irradiation with the plasma, resulting in hardening of the surface film of ink composition. Accordingly, when the ink composition, which is tacky at the surface of printed matter immediately after printing, is irradiated with the plasma, the ink composition instantaneously cures to be in a dried (i.e., tack-free) state. The inventive ink composition is applicable not only to wet offset printing with a dampening solution but also to dry offset printing without a dampening solution.

The plasma used for curing the inventive ink composition may be any plasma that can polymerize various ingredients, in particular, specific ingredients described later contained in the ink composition. The plasma is generated by ionization of gas present in an electric field (i.e., gas present between two separate electrodes to which voltage is applied), and has high energy triggering a chemical reaction. In general, the plasma is generated by current flowing between two separate electrodes, and plasma generators are categorized into a direct type and a remote type by the scheme of the plasma generation. In a direct-type generator, a target, i.e., a printed substrate, passes through a discharge space between electrodes to which voltage is applied and is irradiated with the plasma. The direct-type generator has an advantage of high reactivity by irradiation with hot plasma immediately after generation, but has a risk of damage to the substrate during the discharge or thermal plasma in the generator. In the remote-type generator, the plasma generated in a site remote from a target is carried on flowing plasma gas to the target and is applied onto the target. The remote-type generator can reduce the damage to the substrate, but causes a reduction in reactivity of the plasma due to lowering of the temperature of the plasma during transportation and dispersion of the plasma. Since the inventive ink composition exhibits high reactivity during irradiation with the plasma, superior curability can be achieved with the plasma generated by both direct-type and remote-type generators.

Examples of the gases used to generate the plasma in the present invention include, but not limited to, air, oxygen, carbon dioxide, nitrogen, argon, and water vapor. Preferred are air, oxygen, nitrogen, carbon dioxide, or any mixture thereof.

The inventive ink composition is characterized by containing a pigment, a binder resin, and at least one specific ingredient selected from the group consisting of castor oil, polymerized oil, and alkyd resins having an acid value of 10 mg KOH/g or more. Preferably, the inventive ink composition further contains an oil ingredient besides the essential ingredients. These ingredients will now be described in detail.

[Pigment]

Examples of the pigment include coloring pigments and extender pigments. The coloring pigment is an ingredient for imparting desirable color to the ink composition, and is an essential ingredient for printing, for example, character information and images. In the present invention, a white pigment having no color is also categorized into the coloring pigment. The extender pigment, which has no color, can be used for adjustment of physical characteristics, such as flowability and viscoelasticity, of the ink composition. The inventive ink composition preferably contains at least one of the coloring pigment and the extender pigment. For example, the ink composition not containing the coloring pigment but containing the extender pigment can be used in a transparent varnish or a medium.

Examples of the coloring pigments include yellow pigments, such as Disazo Yellows (Pigment Yellow 12, Pigment Yellow 13, Pigment Yellow 17 and Pigment Yellow 1) and Hansa Yellow; magenta pigments, such as Brilliant Carmine 6B, Lake Red C, and Watching Red; cyan pigments, such as phthalocyanine blue, phthalocyanine green and alkali blue; black pigments, such as carbon black; and white pigments, such as titanium oxide and zinc oxide.

The content of coloring pigment is, for example, about 8 to 30 mass % in the entire ink composition, which content is not limited. A yellow ink composition containing a yellow pigment, a magenta ink composition containing a magenta pigment, a cyan ink composition containing a cyan pigment, and the black ink composition containing a black pigment may be prepared in combination of other complementary color pigments or other complementary color ink compositions.

Examples of the extender pigments include clay, talc, kaolinite (kaolin), barium sulfate, calcium carbonate, silicon oxide, and bentonite. The content of extender pigment is, for example, about 0 to 33 mass % in the entire ink composition, which content is not limited.

[Binder Resin]

The binder resin (hereinafter, also simply referred to as "resin") is an ingredient that serves as a binder for immobilization of the pigment on the surface of a printed paper sheet and for uniform dispersion of the pigment in the ink composition. Such resins are usually usable in the field of ink compositions without limitation. Examples of the resins include rosin-modified phenolic resins, rosin-modified maleic resins, rosin-modified alkyd resins, rosin-modified petroleum resins, rosin ester resins, petroleum resin-modified phenolic resins, acrylic-modified phenolic resins, alkyd resins, vegetable oil-modified alkyd resins, and petroleum resins. The weight-average molecular weight of these resins is preferably, for example, about 3,000 to 300,000. The alkyd resins having an acid value of 10 mg KOH/g or more are used as specific ingredients described later.

Among the above-mentioned resins, at least one resin selected from the group consisting of rosin-modified phenolic resins and rosin-modified maleic resins having a weight-average molecular weight of 10,000 to 150,000 is preferably used from the viewpoints of dispersibility of pigments, print quality, and print stability over a long period.

The resin is heated together with an oil ingredient described later to melt, and is used in a state of the varnish. A gelling agent, such as a metal chelate compound or a metal soap, may be added to the molten varnish prepared by melting of the resin to form a gelled varnish. It is preferred that the use of the gelled varnish prepared from the resin in the production of the ink composition can impart appropriate viscoelasticity to the ink composition.

[Specific Ingredient]

The inventive ink composition is composed of at least one specific ingredient selected from the group consisting of castor oil, polymerized oil, and alkyd resins having an acid value of 10 mg KOH/g or more. Since the inventive ink composition containing the specific ingredient can be readily polymerized when irradiated with the plasma, the ink composition can exhibit superior curability even in the use of a remote-type plasma generator. These ingredients will now be described.

The castor oil is triglyceride of fatty acids having hydroxyl groups. Commercially available castor oil can be used in the invention. The triglycerides of fatty acids, such as soybean oil and linseed oil, have been frequently used as an oil ingredient in ink compositions, but the castor oil has been barely used as an oil ingredient of an ink composition for offset printing. Unexpectedly, the present inventors have found that the castor oil exhibits a significant enhancement in curability of the ink composition during irradiation with the plasma compared to triglycerides of other fatty acids. Based on such findings, the castor oil can be regarded as one of the specific ingredients in the present invention. It should be noted that the castor oil, which is a specific ingredient in the present invention, is not included in the oil ingredient described below.

The upper limit of the content of castor oil in the ink composition is preferably 60 mass %, more preferably 30 mass %, and even more preferably 10 mass %. The lower limit of the content of castor oil in the ink composition is preferably 0.5 mass %, more preferably 2.5 mass %, and even more preferably 5 mass %.

The polymerized oil is produced through thermal polymerization of triglyceride of unsaturated fatty acids and has a high molecular weight. A variety of polymerized oils derived from animal and vegetable oils containing unsaturated fatty acids are commercially available, and these oils may be used in the present invention. Preferred examples of such polymerized oils include polymerized soybean oil, polymerized linseed oil, polymerized castor oil, polymerized and dehydrated castor oil, and polymerized tung oil. These polymerized oils may be used alone or in combination. Processes of producing the polymerized oils derived from animal and vegetable oils can be roughly categorized into simple thermal polymerization and specific thermal polymerization involving blowing oxygen or air. The oil produced by the specific thermal polymerization is called boiled oil. Although the boiled oil may be classified into a different category from the polymerized oil in some cases, the boiled oil is also prepared by polymerization of animal and vegetable oils. The polymerized oil in the present invention accordingly includes boiled oil. The boiled oil is preferably used in the polymerized oil in the present invention. The addition of the polymerized oil to the ink composition can significantly enhance the curability of the ink composition during irradiation with plasma.

The upper limit of the content of polymerized oil in the ink composition is preferably 30 mass %, more preferably 20 mass %, and even more preferably 10 mass %. The lower limit of the content of polymerized oil in the ink composition is preferably 0.5 mass %, more preferably 2.5 mass %, and even more preferably 5 mass %.

The alkyd resin that is a specific ingredient in the present invention has an acid value of 10 mg KOH/g or more. The alkyd resin is a polymer compound formed by reaction of alcohol with fatty acid, and is one type of polyester. Most of the alkyd resins used in ink compositions are prepared by reaction of polyhydric alcohols and acids with fats and oils, such as animal and vegetable oils, and commercially available ones are categorized into a variety of grades having different molecular weight distributions and acid values. The specific ingredient in the present invention may be selected from the commercial products of alkyd resins having an acid value of 10 mg KOH/g or more, or may be synthesized by a known process such that the acid value reaches 10 mg KOH/g or more. The upper limit of the acid value of alkyd resin may be about 100 mg KOH/g. The measurement of acid values is defined by Japanese Industrial Standard (JIS), and the acid values in the present invention are in accordance with this standard. The addition of such alkyd resins to the ink composition can significantly enhance the curability of the ink composition during irradiation with plasma.

The content of alkyd resin having an acid value of 10 mg KOH/g or more in the ink composition is preferably about 2.5 to 30 mass %, more preferably about 2.5 to 25 mass %, and even more preferably about 5 to 25 mass %.

These specific ingredients may be used alone or in combination. The content of specific ingredient in the ink composition is preferably 2.5 mass % or more, more preferably 5 mass % or more, and even more preferably 10 mass % or more, most preferably 20 mass % or more.

[Oil Ingredient]

The oil ingredient is used for dissolution of the resin into the varnish or for adjustment of the viscosity of ink composition. Examples of the oil ingredients include animal and vegetable oils and/or mineral oils, and the ingredients that have been conventionally used for preparation of ink compositions can be used without any limitation. The castor oil, one of the vegetable oils, is classified as a specific ingredient as described above, and is thus not classified as an oil ingredient.

In the present invention, animal and vegetable oils may also include fatty acid esters derived from animal and vegetable oils. Examples of animal and vegetable oils include drying oils and semi-drying oils, such as soybean oil, cottonseed oil, linseed oil, safflower oil, tung oil, tall oil, dehydrated castor oil, and canola oil. Examples of the fatty acid esters derived from animal and vegetable oils include monoalkyl esters of fatty acids derived from the animal and vegetable oils. The fatty acids constituting the monoalkyl esters preferably include saturated or unsaturated fatty acids having 16 to 20 carbon atoms. Examples of such saturated or unsaturated fatty acids include stearic acid, isostearic acid, hydroxystearic acid, oleic acid, linoleic acid, linolenic acid, and eleostearic acid. Examples of the alkyl groups constituting the fatty acid monoalkyl esters include, preferably C1-C10 alkyl groups, more preferably, methyl, ethyl, propyl, isopropyl, butyl, isobutyl, tert-butyl, and 2-ethylhexyl groups.

Such animal and vegetable oils may be used alone or in combination. Preferred examples of the animal and vegetable oils include linseed oil, tung oil, soybean oil, fatty acid esters of linseed oil, fatty acid esters of tung oil, and fatty acid esters of soybean oil. The content of animal and vegetable oils in the ink composition is, for example, about 20 to 60 mass % in the entire ink composition.

Examples of the mineral oils include light mineral oils, which are called solvent ingredients, and heavy mineral oils, which are in a state of lubricating oil. Examples of the light mineral oils include non-aromatic petroleum solvents having a boiling point of 160° C. or higher, preferably 200° C. or higher. Examples of such non-aromatic petroleum solvents include Solvent 0, AF solvent 5, AF solvent 6, and AF solvent 7 available from JXTG Nippon Oil & Energy Corporation. Examples of the heavy mineral oils include various lubricating oils that have been classified into, for example, spindle oil, machine oil, dynamo oil, and cylinder oil. Among these oils, a reduced content of condensed polycyclic aromatic ingredients is preferred from the viewpoint of the compliance with OSHA standards in the United States and EU standards. Examples of such mineral oils include Ink Oil H8™ and Ink Oil H35™ available from JXTG Nippon Oil & Energy Corporation, and SNHB™, SNH46™, SNH220™, and SNH540™ available from Sankyo Yuka Kogyo K. K.

The inventive ink composition can be produced with the ingredients described above by a known process. A typical process involves the steps of: mixing the ingredients; kneading the mixture with, for example, a bead mill or a three-roll mill to disperse the pigment; optionally adding an oil ingredient or additives (e.g., an antioxidant and alcohol), sufficiently stirring the mixture; and adjusting the viscosity. Ordinary ink compositions for offset printing contain drying agents composed of metal complexes to facilitate oxidative hardening. Also in the inventive plasma-curable ink composition, a drying agent composed of such a metal complex is added to promote hardening during irradiation with plasma.

Ordinary ink compositions further contain paraffin wax or PTFE wax to reduce scratches on printed matter. In contrast, the inventive ink composition preferably contains no waxes, that is, the content of wax is preferably 0 mass %. The present inventors find that the waxes in the ink composition retard or inhibit the curing during irradiation with plasma. Although the reason for the delayed curing is not completely clear, it is conceivable that the wax contained in the ink composition segregates onto the surface of the film of ink composition after printing, and the oozing wax blocks the penetration of plasma into the film of ink composition.

<Production of Printed Matter>

Another aspect of the present invention provides a method for producing printed matter. The method involves a step of printing information on a substrate with the inventive ink composition and a step of irradiating the printed substrate with the plasma to fix the ink composition on the surface of the substrate. One embodiment of the inventive method for producing printed matter will now be described below.

The printing step involves printing information on a substrate with the inventive ink composition. Examples of the substrate include paper and film. A printing means is an offset printing process. Examples of such a printing process include single-sheet printing and offset rotary printing. In the offset printing process, ordinary wet offset printing using a dampening solution or dry offset printing not using water may be employed. After the printing step, an image printed with the undried ink composition is formed on the substrate, and the substrate is then subjected to plasma irradiation.

In the plasma irradiation, the printed substrate is irradiated with plasma to cure the ink composition on the surface of substrate, thereby fixing the ink composition. The plasma used in this step may be generated from either a direct-type generator or a remote-type generator. The inventive ink composition has high reactivity with the plasma, resulting in sufficient curing even in the use of the plasma generated from the remote-type generator. Accordingly, the plasma generated from the remote-type generator can be preferably used in this step without damaging the substrate or jamming of the substrate due to vertical flapping that occurs during the transfer of the substrate.

In the use of the plasma generated from the remote-type generator for curing the ink composition, a row of plasma outlet ports is preferably disposed along the width of the substrate. Such multiple outlet ports may be replaced with a linear outlet port extending along the width of the substrate. In order to adjust the hardening of the ink composition, the temperature of plasma applied to the ink composition may be varied by, for example, a method disclosed in JP 4611409B.

Examples of the reaction gas used for generating the plasma include, but not limited to, air, oxygen, carbon dioxide, nitrogen, argon, and water vapor. Among these gases, preferred is air, oxygen, nitrogen, carbon dioxide, or any mixture thereof. The reaction gas passes through a discharged space between two separate electrodes connected to a high-frequency power source to be converted into the plasma, and is then expelled from the outlet port toward the surface of substrate.

<Printing>

Another aspect of the present invention provides a method for printing information. The method involves a step of printing information on a substrate with the inventive ink composition and a step of irradiating the surface of ink composition with plasma to fix the ink composition on the substrate. Since the details have already been described in the inventive method for producing printed matter, the redundant description is omitted in this paragraph.

EXAMPLES

The ink composition of the present invention will be described in further detail by way of the following examples, but the present invention should not be limited to these examples. In the following description, "%" indicates "mass %" and "parts" indicates "parts by mass" unless otherwise specified.

[Preparation of Varnish]

A rosin-modified phenolic resin having a weight-average molecular weight of 100,000 (available from Harima chemicals group, Inc.) (40.5 parts) and soybean oil (58.9 parts) were placed into a four-necked flask equipped with a condenser, a thermometer and a stirrer, and heated at 210° C. for 40 minutes to melt the resin. Aluminum (ethyl acetoacetate) diisopropylate (ALCH, available from Kawaken Fine Chemicals Co., Ltd.) (0.6 parts) was then added to the mixture, and heated at 170° C. for 50 minutes to prepare the varnish.

[Preparation of Ink Composition]

The ink compositions of Examples 1 to 41 and Comparative Examples 1 to 7 were prepared by compounding various materials according to formulations shown in Tables 1 to 8 and kneading the mixtures with a three-roll mill. The amounts of each ingredient shown in Tables 1 to 8 are based on parts by mass. In Tables 1 to 8, "Color pigment" is phthalocyanine, which is a coloring pigment, "Acid value 8 alkyd" is a soybean oil-modified alkyd resin having an acid value of 8 mg KOH/g, "Acid value 15 alkyd" is a soybean oil-modified alkyd resin having an acid value of 15 mg KOH/g, and "Acid value 19 alkyd" is a soybean oil-modified alkyd resin having an acid value of 19 mg KOH/g. All of polymerized soybean oil, polymerized linseed oil, polymerized castor oil, and polymerized and dehydrated castor oil used in the materials are boiled oils.

[Evaluation of Curability]

The curability for each ink composition of Examples 1 to 41 and Comparative Examples 1 to 7 was evaluated after irradiation with plasma. A fraction (0.1 cc) of the ink composition was spread on a polypropylene (PP) film (product name: Polysame PC-8162, available from Sekisui Seikei Co., Ltd.) with an RI drawdown machine (dual-split roll, available from Akira Co., Ltd.), and the drawn surface was irradiated with plasma using a damage-free multi-gas plasma jet (a remote-type plasma generator) available from Plasma Concept Tokyo, Inc. In the irradiation, the gas for plasma was air (flow rate: 5 L/min), the radiation diameter of plasma was 1 mm, and the radiation distance was 4 mm. Each of the ink compositions was irradiated for a variable time from one to ten seconds with an increment of one second. For each irradiation time, the uncured ink composition was wiped off with absorbent cotton, and the diameter of a circular cured film was measured. The irradiation time in seconds required to start curing and the diameter of the cured film at an irradiation time of seven seconds were used in evaluation. The results are shown in the columns, "Time to start curing" and "Diameter of cured film", in Tables 1 to 8. A shorter time to start curing indicates that an ink composition has higher reactivity with plasma. Since the reactivity of plasma decreases from the center to the periphery of the irradiated area, a larger diameter of the cured film indicates that an ink composition has higher reactivity with plasma.

TABLE 1

| | Example 1 | Example 2 | Example 3 | Example 4 | Example 5 | Comparative Example 1 |
|---|---|---|---|---|---|---|
| Varnish | 58 | 58 | 58 | 58 | 58 | 58 |
| Color pigment | 17 | 17 | 17 | 17 | 17 | 17 |
| Soybean oil | 20 | 15 | 10 | 5 | — | 25 |
| Castor oil | 5 | 10 | 15 | 20 | 25 | — |
| Total | 100 | 100 | 100 | 100 | 100 | 100 |
| Time to start curing (seconds) | 4 | 1 | 1 | 1 | 1 | 10 |
| Diameter of cured film (mm) | 5 | 10 | 10 | 10 | 10 | 0 |

TABLE 2

|  | Example 6 | Example 7 | Example 8 | Example 9 | Example 10 | Example 11 |
|---|---|---|---|---|---|---|
| Varnish | 58 | 58 | 58 | 58 | 58 | 58 |
| Color pigment | 17 | 17 | 17 | 17 | 17 | 17 |
| Soybean oil | 22.5 | 20 | 15 | 10 | 5 | — |
| Polymerized soybean oil | 2.5 | 5 | 10 | 15 | 20 | 25 |
| Total | 100 | 100 | 100 | 100 | 100 | 100 |
| Time to start curing (seconds) | 7 | 5 | 4 | 2 | 1 | 1 |
| Diameter of cured film (mm) | 3 | 5 | 5 | 8 | 8 | 8 |

TABLE 3

|  | Example 12 | Example 13 | Example 14 | Example 15 | Example 16 | Example 17 |
|---|---|---|---|---|---|---|
| Varnish | 58 | 58 | 58 | 58 | 58 | 58 |
| Color pigment | 17 | 17 | 17 | 17 | 17 | 17 |
| Soybean oil | 22.5 | 20 | 15 | 10 | 5 | — |
| Polymerized linseed oil | 2.5 | 5 | 10 | 15 | 20 | 25 |
| Total | 100 | 100 | 100 | 100 | 100 | 100 |
| Time to start curing (seconds) | 5 | 4 | 4 | 3 | 3 | 3 |
| Diameter of cured film (mm) | 3 | 4 | 4 | 5 | 5 | 6 |

TABLE 4

|  | Example 18 | Example 19 | Example 20 | Example 21 | Example 22 | Example 23 |
|---|---|---|---|---|---|---|
| Varnish | 58 | 58 | 58 | 58 | 58 | 58 |
| Color pigment | 17 | 17 | 17 | 17 | 17 | 17 |
| Soybean oil | 22.5 | 20 | 15 | 10 | 5 | — |
| Polymerized castor oil | 2.5 | 5 | 10 | 15 | 20 | 25 |
| Total | 100 | 100 | 100 | 100 | 100 | 100 |
| Time to start curing (seconds) | 5 | 5 | 4 | 3 | 3 | 2 |
| Diameter of cured film (mm) | 3 | 4 | 4 | 5 | 6 | 7 |

TABLE 5

|  | Example 24 | Example 25 | Example 26 | Example 27 | Example 28 | Example 29 |
|---|---|---|---|---|---|---|
| Varnish | 58 | 58 | 58 | 58 | 58 | 58 |
| Color pigment | 17 | 17 | 17 | 17 | 17 | 17 |
| Soybean oil | 22.5 | 20 | 15 | 10 | 5 | — |
| Polymerized and dehydrated castor oil | 2.5 | 5 | 10 | 15 | 20 | 25 |
| Total | 100 | 100 | 100 | 100 | 100 | 100 |
| Time to start curing (seconds) | 6 | 3 | 1 | 1 | 1 | 1 |
| Diameter of cured film (mm) | 2 | 5 | 5 | 7 | 8 | 9 |

TABLE 6

|  | Example 30 | Example 31 | Example 32 | Example 33 | Example 34 | Example 35 |
|---|---|---|---|---|---|---|
| Varnish | 58 | 58 | 58 | 58 | 58 | 58 |
| Color pigment | 17 | 17 | 17 | 17 | 17 | 17 |
| Soybean oil | 22.5 | 20 | 15 | 10 | 5 | — |
| Acid value 15 alkyd | 2.5 | 5 | 10 | 15 | 20 | 25 |
| Total | 100 | 100 | 100 | 100 | 100 | 100 |
| Time to start curing (seconds) | 7 | 7 | 6 | 6 | 4 | 3 |
| Diameter of cured film (mm) | 3 | 4 | 5 | 5 | 5 | 6 |

TABLE 7

|  | Example 36 | Example 37 | Example 38 | Example 39 | Example 40 | Example 41 |
|---|---|---|---|---|---|---|
| Varnish | 58 | 58 | 58 | 58 | 58 | 58 |
| Color pigment | 17 | 17 | 17 | 17 | 17 | 17 |
| Soybean oil | 22.5 | 20 | 15 | 10 | 5 | — |
| Acid value 19 alkyd | 2.5 | 5 | 10 | 15 | 20 | 25 |
| Total | 100 | 100 | 100 | 100 | 100 | 100 |
| Time to start curing (seconds) | 7 | 7 | 6 | 2 | 2 | 1 |
| Diameter of cured film (mm) | 3 | 3 | 6 | 8 | 8 | 8 |

TABLE 8

|  | Comparative Example 2 | Comparative Example 3 | Comparative Example 4 | Comparative Example 5 | Comparative Example 6 | Comparative Example 7 |
|---|---|---|---|---|---|---|
| Varnish | 58 | 58 | 58 | 58 | 58 | 58 |
| Color pigment | 17 | 17 | 17 | 17 | 17 | 17 |
| Soybean oil | 22.5 | 20 | 15 | 10 | 5 | — |
| Acid value 8 alkyd | 2.5 | 5 | 10 | 15 | 20 | 25 |
| Total | 100 | 100 | 100 | 100 | 100 | 100 |
| Time to start curing (seconds) | 7 | 7 | 7 | 5 | 5 | 4 |
| Diameter of cured film (mm) | 1 | 2 | 1 | 3 | 3 | 4 |

The results of Tables 1 to 8 illustrate that the ink compositions containing the specific ingredients in the present invention exhibit high curability after irradiation with plasma.

The invention claimed is:

1. An ink composition comprising:
   a pigment;
   a binder resin; and
   at least one specific ingredient selected from the group consisting of castor oil, polymerized oil, and alkyd resins having an acid value of 10 mg KOH/g or more, wherein
   a reactivity of the ink composition is configured so that the ink composition is curable by a remote-type plasma which is generated at a site remote from a target substrate and is carried on flowing plasma gas to the target substrate and applied onto the target substrate for offset printing, wherein
   the content of the specific ingredient is 2.5 mass % or more and 14 mass % or less of the entire composition.

2. The ink composition curable by the remote-type plasma for offset printing according to claim 1, wherein the polymerized oil is boiled oil.

3. The ink composition curable by the remote-type plasma for offset printing according to claim 1, wherein the polymerized oil is at least one selected from the group consisting of polymerized soybean oil, polymerized linseed oil, polymerized castor oil, polymerized and dehydrated castor oil, and polymerized tung oil.

4. A method of producing printed matter, comprising the steps of:
   preparing an ink composition comprising a pigment, a binder resin, and at least one specific ingredient selected from the group consisting of castor oil, polymerized oil, and alkyd resins having an acid value of 10 mg KOH/g or more, a reactivity of the ink composition configured so that the ink composition is curable by a remote-type plasma which is generated at a site remote from a target substrate and is carried on flowing plasma gas to the target substrate and applied onto the target substrate for offset printing,
   printing information on the target substrate with the ink composition, and
   irradiating the printed substrate with the remote-type plasma for curing to fix the ink composition present on a surface of the target substrate, wherein
   the content of the specific ingredient is 2.5 mass % or more and 14 mass % or less of the entire composition.

5. The method of producing printed matter according to claim 4, wherein the remote-type plasma is generated by supplying a discharge space between two electrodes with a stream of air, oxygen, nitrogen, carbon dioxide, or any mixture thereof.

6. The method of producing printed matter according to claim 4, wherein the polymerized oil is boiled oil.

7. The method of producing printed matter according to claim 4, wherein the polymerized oil is at least one selected from the group consisting of polymerized soybean oil, polymerized linseed oil, polymerized castor oil, polymerized and dehydrated castor oil, and polymerized tung oil.

8. A method of producing printed matter, comprising the steps of:
   preparing an ink composition comprising a pigment, a binder resin, and at least one specific ingredient selected from the group consisting of castor oil, polymerized oil, and alkyd resins having an acid value of 10 mg KOH/g or more, a reactivity of the ink composition configured so that the ink composition is curable by a remote-type plasma which is generated at a site remote from a target substrate and is carried on flowing plasma gas to the target substrate and applied onto the target substrate for offset printing,
   printing information on the target substrate with the ink composition; and
   irradiating a surface of the printed ink composition with the remote-type plasma to fix the ink composition on the target substrate, wherein
   the content of the specific ingredient is 2.5 mass % or more and 14 mass % or less of the entire composition.

9. The method of producing printed matter according to claim 8, wherein the polymerized oil is boiled oil.

10. The method of producing printed matter according to claim 8, wherein the polymerized oil is at least one selected from the group consisting of polymerized soybean oil, polymerized linseed oil, polymerized castor oil, polymerized and dehydrated castor oil, and polymerized tung oil.

11. The method of producing printed matter according to claim 8, wherein the remote-type plasma is generated by supplying a discharge space between two electrodes with a stream of air, oxygen, nitrogen, carbon dioxide, or any mixture thereof.

* * * * *